United States Patent [19]

Fridlyand

[11] Patent Number: 4,810,851

[45] Date of Patent: Mar. 7, 1989

[54] METHOD OF CONSTANTLY RESTORING AN ELECTRODE DURING PLASMA TREATMENT OF MATERIALS

[75] Inventor: Mikhail G. Fridlyand, Leningrad, U.S.S.R.

[73] Assignee: Gossudarsvenny Proektny i Nauchno-Issledovatelsky Institute Nikelevo-Kobaltovoi Promyshylennosti, Leningrad, U.S.S.R.

[21] Appl. No.: 64,259

[22] PCT Filed: Jul. 7, 1985

[86] PCT No.: PCT/SU85/00062

§ 371 Date: Mar. 13, 1987

§ 102(e) Date: Mar. 13, 1987

[87] PCT Pub. No.: WO87/00469

PCT Pub. Date: Jan. 29, 1987

[51] Int. Cl.[4] .................................................. B23K 9/00
[52] U.S. Cl. ......................... 219/121.59; 219/121.52; 219/119

[58] Field of Search ...... 219/121 PU, 121 P, 121 PV, 219/121 PW, 121 PR, 74, 75, 118, 119; 313/231.31, 231.41, 231.51

[56] References Cited

U.S. PATENT DOCUMENTS 3,307,011 2/1967 Baird ................................ 219/121 P
4,317,984 3/1982 Fridlyand ..................... 219/121 PR

FOREIGN PATENT DOCUMENTS 2431240 7/1978 France .
0841850 6/1981 U.S.S.R. .
0844178 7/1981 U.S.S.R. .

*Primary Examiner*—M. H. Paschall
*Attorney, Agent, or Firm*—McAulay, Fields, Fisher, Goldstein & Nissen

[57] ABSTRACT

A method of electric arc treatment of materials by constantly restored solid and hollow electrodes in plasma-forming mixtures including hydrocarbons and carbon oxides, whereby carbon is deposited on an initial electrode (2) to form said constantly restored true-carbon electrode (1). Treatment is performed at a temperature of contact of the initial and true electrodes (2,1) not exceeding the temperature of carbon sublimation.

16 Claims, 1 Drawing Sheet

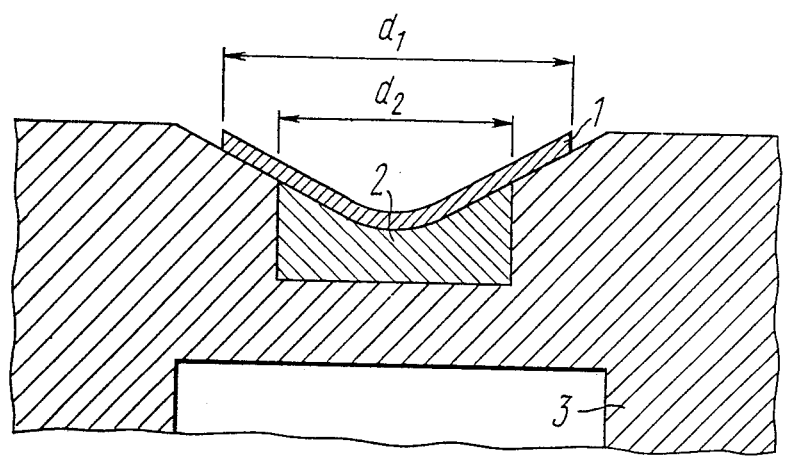

METHOD OF CONSTANTLY RESTORING AN ELECTRODE DURING PLASMA TREATMENT OF MATERIALS

FIELD OF THE INVENTION

The present invention relates to electric welding and metallurgy and, more particularly, to a method of electric arc treatment of materials with a constantly restored electrode.

BACKGROUND OF THE INVENTION

At present, one of the essential problems faced be welding and metallurgical technologies is enhancing the stability of electrodes of electric arc apparatus operated for welding and similar processes of treatment of metals, as well as for melting and similar processes of treatment of metal and slag melts in electric-arc furnaces.

Known in the art is a method of electric arc treatment of materials (U.S. Pat. No. 3,307,011, Cl. 219–74, 1963), providing for enhancing the stability of electrodes, graphite electrodes included, of electric arc apparatus. The method includes introducing into the space between the electrodes of an electric arc apparatus plasma-forming mixtures including carbon-containing compounds chosen from the class of hydrocarbons and carbon monoxide, and gases inert with respect to the material of the electrodes. With the electric arc burning, these carbon-containing gases decompose and release free carbon which is deposited on at least one of the electrodes. Used as gases inert with respect to particular materials are argon or helium when the electrode is made of graphite, or else air or nitrogen when the electrode is made of copper.

This method makes it possible to reduce the erosion of electrodes and thus to extent their operating life with stable arcing at currents from 400 to 1000 amperes.

However, this process would not ensure an equilibrium of the respective quantities of the loss of carbon and its deposition on the working surface of the electrode. The weight of the electrode would either continuously diminish, although at a small rate, which means that the electrode erodes, or else continuously grows, which means that the dimensions of the electrode increase. In the first-mentioned case the electrode becomes ultimately destroyed. In the second-mentioned case the stability of arcing is affected on account of hindered localization of the electrode-adjoining region of the arc on the increased working surface of the electrode.

The aforementioned phenomenon can be explained by the following reasons: firstly, the use of only the gases inert with respect to the material of the electrodes in the composition of a plasma-forming mixture; secondly, the lack of quantitative relationship between the arc current value, the composition and flow rate of the plasma-forming mixture; and thirdly, the lack of relationship between the variation of the composition of the plasma-forming mixture and the time of arcing, particularly, in the initial period of ignition of the arc. The necessity of using electrodes which are either block-shaped or hollow in some cases restrains the applicability of the method, as it would not ensure the required localization of either the arc or the jet of plasma within the treatment area.

It is for these reasons that the aforementioned method has not yet found industrial applications notwithstanding the fact that it was published as many as twenty years ago.

There is further known a method of electric arc or plasma treatment of materials (U.S. Pat. No. 4,317,984, Cl. 219–75, 1982; FR, B, No. 2431240, Int. Cl.$^3$ H05H 1/48, B23K 9/16, 1983) consisting of introducing into the space between the electrodes of an electric arc apparatus a plasma-forming mixture including carbon-containing compounds and an oxidizing agent.

The oxidizing agent is introduced within a time interval corresponding to the reduction of the flow of heat into the electrode on which carbon is deposited from the peak value to a steady value. Depending on the nature of the oxidizing agent, its content in the plasma-forming mixture is taken to be either 0.4 to 0.9 or 1.05 to 2.5 by volume of that corresponding to theoretically complete conversion of hydrocarbons in the mixture. The first-mentioned range applies to an oxidizing agent in the form of either oxygen or air, and the second-mentioned range applies to an oxidizing agent in the form of carbon dioxide. Depending on the chemical affinity of the oxidizing agent for the carbon of the carbon-containing compound, the latter is supplied into the space between the electrodes in the amount of from $(0.5\times10^{-3})/n$ to $(6\times10^{-3})/n$ l/amp-sec, where "n" is a number of atoms of carbon in the employed carbon-containing compound. The carbon-containing compound and oxidizing agent may be introduced into the space between the electrodes either separately or jointly. When the heat flow into the electrode on which carbon is deposited attains the peak value already at the moment of striking an arc, the oxidizing agent is introduced into the space between the electrodes jointly with the carbon-containing gas prior to striking an arc.

This method provides for performance of the electrode in an equilibrium of the loss of carbon therefrom and supply of carbon thereto, i.e. in a mode of constant restoration of the electrode from the plasma-forming medium.

However, this method determines all the conditions for ensuring the operation of the electrode in a mode of constant restoration only on the part of the plasma-forming medium, and does not deal with similar conditions on the part of the electrode itself. This has been found to impede the reproducibility of a mode of constant restoration of the electrode when the value of the current of the arc varied within a relatively broad range, resulting in erosion of the electrode.

SUMMARY OF THE INVENTION

It is an object of the present invention to provide a method of electric arc treatment of materials with a constantly restored electrode, ensuring stable reproducibility of a mode of constant restoration of the electrode owing to an improved technology of conducting the process in the space between the electrodes and on the surface of the electrode itself.

This and other objects are attained in a method of electric arc treatment of materials with constantly restored solid and hollow electrodes by introducing into the space between these electrodes a plasma-forming mixture including carbon-containing compounds chosen from the class of hydrocarbons and carbon oxides to provide in the course of arc burning carbon deposition upon at least on one of the initial electrodes made of either carbon or carbide-forming metals, and formation on the surface of said electrode of a true carbon cathode, wherein according to the invention the treatment is conducted at a temperature of contact of the initial and true electrodes, not exceeding the temperature of sublimation of carbon.

It is expedient to conduct the treatment with the initial solid electrode with the current density at the initial electrode being maintained within a range from $10^4$ A/cm$^2$ to $10^5$ A/cm$^2$. Electric arc treatment of materials with a constantly restored electrode at a temperature of the contact of the initial and true electrode not exceeding the temperature of sublimation of carbon provides for stable reproducibility of a mode of constant restoration of the electrode within a broad range of variation of the parameters of the electric arc, yielding enhanced stability of the electrodes of electric arc devices used in welding technologies and in metallurgy.

BRIEF DESCRIPTION OF THE ACCOMPANYING DRAWING

The invention will be further described in connection with its embodiments and examples of performing the method in accordance with the invention, with reference being made to the accompanying schematic drawing illustrating the method of constant restoration of an electrode, according to the invention.

PREFERRED EMBODIMENT OF THE INVENTION

The method of electric arc treatment of materials with solid and hollow electrodes resides in the following.

There is introduced into the space between the electrodes of an electric arc device a plasma-forming mixture including carbon-containing compounds. The latter are hydrocarbons either in their initial gaseous state (e.g. natural gases of various compositions, such as methane, acetylene and the like) or in a liquefied state (propane, butane, their blends and the like), and also carbon oxides: its monoxide CO and dioxide $CO_2$. With an electric arc burning in a gaseous atmosphere including the carbon-containing compounds, there is ensured deposition of carbon evolved by decomposition of these compounds in the arc upon the working surface of at least one of the initial electrodes and formation of this surface of a true carbon electrode constantly restored from the plasma-forming mixture.

The initial electrode, either solid or hollow, is made of either carbon (preferably in the form of graphite) or carbide-forming metals, e.g. hafnium, titanium, zirconium and the like. The treatment is conducted at a temperature of the contact of the initial solid or hollow electrode with the true constantly restored carbon electrode not exceeding the temperature of sublimation of carbon, which is about 4000 K. The treatment with the initial solid electrode is conducted at the current density at the initial electrode being within a range from $10^4$ A/cm$^2$ to $10^5$ A/cm$^2$.

Generally, the operation of the electrode in a mode of constant restoration is provided for under a condition that the rate of loss $G_1$ of the material of the electrode does not exceed the rate of deposition $G_2$ thereupon of the same material from the outside, i.e. $G_1 \leq G_2$.

Thus, with the electrode operating as the cathode, the loss $G_1$ of its material is mainly defined by its evaporation, while the deposition $G_2$ is defined by the deposition of the material in the form of positively charged ions which are subsequently neutralized on the working surface of the cathode.

Constant restoration of the electrode (e.g. cathode) is possible from any gaseous atmosphere (the plasma-forming medium) containing compounds decomposing at arc temperature, evolving products capable of being deposited onto the working surface of the electrode and possessing the appropriate thermal emission and thermophysical characteristics. The ready availability, relatively low cost, ease of transportation, simple and safe performance of such carbon containing compounds as hydrocarbons and carbon oxides (its monoxide CO and dioxide $CO_2$) make them an obvious choice as the atmosphere ensuring constant restoration of the electrode. Decomposition of these compounds in an electric arc yields, alongside of other components, carbon featuring both a high point of phase transition (the temperature of sublimation $t_s \approx 4000$ K.) and relatively low work on escaping ($\phi = 4.7$ eV).

Let us consider the appended schematic drawing of a constantly restored electrode on an electric arc device with he arc burning in a plasma-forming medium including carbon-containing compounds.

The true electrode (cathode) 1 of a diameter $d_1$ is deposited in a thin layer on the surface of the initially mounted solid bar-shaped electrode 2 having a diameter $d_2$ and on a portion of a copper water-cooling holder 3, adjoining this surface. To speed up the formation of the true electrode 1 and enhance its adhesion to the initial electrode 2 the latter is made of either graphite or carbide-forming metal. The initial electrode 2 may be either solid or hollow, either press-fitted into the copper water-cooling holder or free.

The initial electrode 2 acts as the working electrode exclusively within an initial period upon the first striking of an arc, until the true electrode 1 is formed of carbon deposited from the carbon-containing gaseous atmosphere of the arc. Further on, the initial electrode 2 becomes a passive element functioning, same as the copper water-cooled holder 3, solely as one of the links of the heat transfer chain from the working surface of the true electrode 1 of the cooling medium.

The abovesaid defines the major and fundamental difference between a constantly restored electrode and a conventional electrode which would always erode to this or that degree and where the electrode (cathode) region of the arc is always and exclusively localized on a surface formed either by the material of the initial electrode 2 (e.g. W or Mo in argon) or by compounds of this material with components of the gaseous atmosphere (e.g. Hf, Zr, Ti in air). Therefore, the diameter $d_2$ of the initial electrode 2 in case of conventional electrodes is always either equal to or greater than the diameter of the working surface visited by the electrode-adjoining region of the arc. As research conducted by the authors of the present invention has proved, the diameter $d_1$ of the true electrode 1 under the conditions of its constant restoration in most cases is greater than the diameter $d_2$ of the initial electrode 2. Thus, there is formed on an electrode including the copper holder 3 with the initial electrode 2—a solid graphite bar of a diameter $d_2 = 0.15$ cm, with an arc burning at 500 A, a true graphite electrode of a diameter $d_1$ of some 0.3 cm, which is constantly restored from the gaseous phase.

Considering that constant restoration of an electrode is feasible only when the supply of the material from the gaseous phase onto the working surface of the true electrode 1 is balanced with the loss of this material on account of evaporation, there exist two essential prerequisites for operation of the elecrode in this mode.

The first one of these conditions defining the content of depositable carbon in the gaseous phase and has been set fourth, e.g. in the above cited U.S. Pat. No. 4,317,984 and FR, B, No. 2431240.

The second condition deals with the transfer of heat from the working surface of the electrode to a medium cooling this electrode. This condition is concerned with the temperature of the initial electrode 2 in the contact with the true electrode 1, with the arc burning at a predetermined current, not exceeding the point of phase transition (either melting or sublimation) of the deposited material, which in case of graphite is equal to about 4000 K.

The distribution of temperatures in the composition electrode wherein the working surface of the true electrode 1 receives a heat flow Q transferred via the initial electrode 2 and copper holder 3 to the cooling medium is generally determined by known relationships of heat transfer through a laminated wall:

$$T_1 - T_2 = \frac{Q}{F} / \Sigma R_i = q \Sigma R_i,$$

where $T_1$ is the temperature on the working surface of the true electrode 1, K;

$T_2$ is the temperature at the interface of the holder 3 and the cooling medium, K;

$F_2$ is the surface of heat input into the true electrode 1, $m^2$;

q is the density of the heat flow into the true electrode, $W/m^2$;

$R_i = S_i/\lambda_i$ is the thermal resistance of each link of heat transfer from the working surface of the true electrode 1 to the cooling medium, $m^2 \cdot K \cdot W^{-1}$;

$S_i$ is the extent of each link of heat transfer, m;

$\lambda_i$ is the thermal conductivity of the material of each respective link of the heat transfer chain, $W \cdot m^{-1} \cdot K^{-1}$.

Thus, for a solid initial electrode 2, $R = d_2/2\lambda$, where $d_2$ is the diameter of the initial electrode 2.

The thermal conductivity of copper (394 $W \cdot m^{-1} \cdot K^{-1}$) is significantly higher than that of graphite ($\sim 60$ $W \cdot m^{-1} \cdot K^{-1}$) and of carbide-forming metals: hafnium (21 $W \cdot m^{-1} \cdot K^{-1}$), zirconium (17 $W \cdot m^{-1} \cdot K^{-1}$), titanium (17 $W \cdot m^{-1} \cdot K^{-1}$), and others.

Therefore, there two directions of reducing the temperature of the initial electrode 2 in the contact with (at the interface with) the true electrode 1.

The first direction is that of reducing the thermal resistance of the initial electrode 2, which is feasible only by decreasing the diameter $d_2$ of this electrode, this with a predetermined current value is tantamount to stepping up the current density at the electrode.

Table 1 below submits data obtained by calculations and proved experimentally on temperatures of the contact of the initial electrode 2 and the true electrode 1 of an arc burning at 500 A in a mixture of carbon dioxide and natural fuel gas, depending on the diameter of and current density at the initial graphite electrode.

TABLE 1

| Diameter of initial electrode $d_2$ cm | Current density at initial electrode $4 I/\pi d^2$ $A/cm^2$ | Temperature at interface of initial 2 and true 1 electrodes K | Remarks |
| --- | --- | --- | --- |
| 0.15 | $2.83 \times 10^4$ | 3605 | Electrode (cathode) operates in constant restoration mode |
| 0.20 | $1.59 \times 10^4$ | 3919 | Electrode (cathode) operates in constant restoration mode |
| 0.26 | $9.42 \times 10^3$ | 4126 | Electrode (cathode) is being evoded |
| 0.30 | $7.07 \times 10^3$ | 4510 | Electrode (cathode) is being actively evoded |
| 0.50 | $2.55 \times 10^3$ | 4915 | Electrode (cathode) is being actively evoded |

An analysis of the above data indicates that with current densities at the initial electrode 2 being short of $10^4$ $A/cm^2$, i.e. with its diameter $d_2$ being above the critical value for 500 A current, the electrode (cathode) is destroyed by the temperature of the contact of the initial and true electrodes 2 and 1 being above the point of sublimation of graphite $\sim 4000$ K. Similar results have been obtained for all other investigated current values.

Thus, the current density at the initial electrode 2, equalling $10^4$ $A/cm^2$, determines at a given current value the critical diameter of the initial electrode 2 whose increase (i.e. an increase of the diameter $d_2$) would lead to the destruction of the electrode by the temperature of the contact of the initial and true electrodes 2 and 1 exceeding the sublimation point of graphite.

When the current density exceeds $10^5$ $A/cm^2$, the relatively small area of contact of the true electrode 1 with the initial electrode 2 has been found to affect the strength of their bonding. This results in mechanical destruction of the electrode on account of delamination of the true electrode 1 from the initial electrode 2, particularly under transient conditions when the arc is switched on and off, or during sharp variation of its current value, etc.

The employment of this first direction of reducing the temperature of the initial electrode 2 is preferable in electric arc treatment with a bar-shaped solid electrode, e.g. electric welding, electric-arc buildup, deposition by spraying, etc.

The second method of reducing the temperature of the initial electrode consists in reducing the density "q" of the heat flow into the true electrode 1, i.e. increasing the working surface area F of the true electrode. This method is preferable in electric arc treatment with a hollow electrode made of the same materials as the solid electrode described hereinabove, via a channel into which either the entire amount of the plasma-forming mixture or a part thereof is supplied, e.g. in treatment of metallurgical melts, in gas-heating, etc.

EXAMPLE 1

Plasma welding of steel plate pieces 0.3 cm thick was conducted along raised edges in carbon dioxide supplied at a rate from 0.4 $m^3/hr$ to 0.6 $m^3/hr$. The welding was performed at a 195 A d.c. current with an outward arc, in a plasmatron with a composite water-cooled electrode comprising a copper holder 3 having press-fitted therein the initial electrode (cathode) 2 of a hafnium bar of a diameter $d_2=0.05$ cm, wih a current density at the initial electrode 2 equalling $9.934\times10^4$ A cm². The welding was conducted with constant restoration of the true carbon electrode 1, i.e. with its unvarying dimensions and geometry for practically unlimited time, which proved that the temperature in the zone of contact of the true and initial electrodes 1 and 2 was below the temperature of sublimation of carbon.

When the welding current was raised to 210 A, which with the given diameter $d_2$ of the active insert equalling 0.05 cm² corresponding to the raising of the current density thereto to $1.07\times10^5$, i.e. to a value exceeding by but 6.9% the abovestated upper limit of the current density, each time when the arc was turned off, the true electrode 1 separated itself from the initial electrode 2. This would not provide for a prolonged operation of the electrode in a constant restoration mode.

EXAMPLE 2

Mechanized plasma-jet spraying of a refractory protecting lining of corundum (aluminum oxide) onto the surface of panels of silicon carbide was conducted. A mixture of natural fuel gas and carbon dioxide was used with the supply rates of 2.0 and 6.0 m³/hr, respectively. The spraying was performed at 500 A d.c. in a plasmatron with a composition electrode (cathode) mde of the water-cooled copper holder 3 having press-fitted therein a graphite bar-type initial electrode 2 of a 0.12 cm diameter, with the current density at the initial electrode equalling $24.4\times10^4$ A/cm². The electrode performed in a constant restoration mode for several months.

EXAMPLE 3

A slag bath was heated and blasted for reduction of slag components with a blast of a gas heated in a d.c. electric arc ignited between an annular graphite electrode-cathode and the slag melt-anode at a 1100 A current. The gaseous atmosphere of the arc was a mixture of natural fuel gas and carbon dioxide supplied at respective rates of 10 m³/hr and 5 m³/hr via the axial passage 25 mm in diameter in the initial graphite electrode 2 having an outside diameter $d_2=125$ mm.

Under these conditions, there was being formed on the face portion of the initial graphite electrode 2 a true carbon electrode 1 which performed in a mode of constant restoration at a temperature in the area of contact between the initial and true electrodes 1 below the point of sublimation of carbon.

INDUSTRIAL APPLICABILITY

The present invention can be employed at plasma treatment of metals, e.g. their welding, buildup, spraying, and also in treatment of metal and slag melts in metallurgy.

I claim:

1. In a method of constantly restoring an electrode during plasma treatment of materials, in an electric arc device having a pair of spaced electrode elements, one of said electrode elements being constantly restored and comprising a water cooler holder (3) supporting a solid bar-shaped electrode (2) forming an initial electrode onto which is deposited a cathode electrode (1) forming a true electrode, the cathode electrode (1) being deposited in a thin layer onto the surface of said solid bar-shaped initial electrode; the materials being treated by introducing, into the space between the electrode elements and on the initial and cathode electrodes themselves, a plasma-forming mixture including carbon-containing compounds chosen from the class of hydrocarbons and carbon oxides, which provides, in the course of arc burning, carbon deposition upon the initial electrode (2), said initial electrode being made of either carbon or carbide-forming metals, and formation on the surface of said electrode of a true carbon cathode, and conducting the treatment at a temperature of contact of said initial electrode (2) and the cathode electrode (1) at a temperature not exceeding the temperature of sublimation of carbon which is about 4000° K.

2. A method according to claim 3, wherein the treatment with the solid initial electrode (2) is conducted at a current density at the initial electrode (2) within a range from $10^4$ A/cm² to $10^5$ A/cm².

3. The method of claim 1, wherein the carbon electrode (1) is preferably formed of graphite.

4. The method of claim 1, wherein the carbide-forming metals include hafnium, titanium, tungsten, molybdenum and zirconium.

5. The method of claim 1, including conducting the process in the space between the electrodes on the surface of the initial electrode (2), and said cathode electrode (1) each act as a true electrode, and said initial electrode (2) acts as the working electrode within the initial period.

6. The method of claim 1, wherein the plasma-forming mixture is selected from the group consisting of hydrocarbons in their initial gaseous state, hydrocarbons in their liquified state, and blends thereof, and carbon monoxide and carbon dioxide.

7. The method of claim 1, wherein the plasma-forming mixture includes methane.

8. The method of claim 1, wherein the plasma-forming mixture includes acetylene.

9. The method of claim 1, wherein the plasma-forming mixture includes propane.

10. The method of claim 1, wherein the plasma-forming mixture includes butane.

11. The method of claim 1, wherein said bar-shaped electrode (2) is press-fitted into said water cooler holder (3).

12. The method of claim 1, wherein the initial electrode (2) is formed from either tungsten or molybdenum or compounds thereof in argon.

13. In a method of constantly restoring an electrode during plasma treatment of materials, wherein the materials are electrically arc treated in an electric arc device having a pair of spaced electrode elements, one of said electrode elements being a constantly restored electrode, and comprising a water cooler holder (3) supporting a solid bar-shaped electrode (2) forming an initial electrode (2) during the initial period onto which is deposited a cathode electrode (1) forming a true electrode, the cathode electrode (1) being deposited in a thin layer onto the surface of said solid bar-shaped electrode (2) which acts as a working electrode within an initial period upon first striking of an arc until the true electrode (1) is formed of carbon deposited from the carbon-containing gaseous atmosphere of the arc, the materials being treated with constantly restored solid and hollow electrode by introducing, into the space between the electrode elements and on the initial and cathode electrodes themselves, a plasma-forming mixture including carbon-containing compounds chosen from the class of hydrocarbons and carbon oxides, which provides, in the course of arc burning, carbon deposition upon the initial electrode (2), said initial electrode (2) being made of either carbon or carbide-forming metals, and formation on the surface of said initial electrode (2) of a true carbon cathode, and conducting the treatment at a temperature of contact of said initial electrode (2) and the cathode electrode (1) at a temperature not exceeding the temperature of sublimation of carbon.

14. In the method of claim 13, wherein the temperature of sublimation of carbon is approximately equal to ($\cong$) 4000° K.

15. In the method of claim 13, wherein after the initial stages of the process, said initial electrode (2) becomes a passive element functioning in the same manner as said copper water cooled holder (3), solely as one of the links of the heat transfer chain from the working surface of the true electrode (1) to the cooling medium.

16. In the method of claim 13, wherein the temperature of the initial electrode is reduced by reducing the density of the heat flow into the true or cathode electrode (1).

* * * * *